(12) United States Patent
Zhu

(10) Patent No.: US 10,409,280 B2
(45) Date of Patent: Sep. 10, 2019

(54) CONTROL DOMINATED PLANNING AND CONTROL SYSTEM FOR AUTONOMOUS DRIVING VEHICLES

(71) Applicant: Baidu USA LLC, Sunnyvale, CA (US)

(72) Inventor: Fan Zhu, Sunnyvale, CA (US)

(73) Assignee: BAIDU USA LLC, Sunnyvale, CA (US)

(*) Notice: Subject to any disclaimer, the term of this patent is extended or adjusted under 35 U.S.C. 154(b) by 220 days.

(21) Appl. No.: 15/465,168

(22) Filed: Mar. 21, 2017

(65) Prior Publication Data

US 2018/0275656 A1 Sep. 27, 2018

(51) Int. Cl.
| | |
|---|---|
| B60W 30/095 | (2012.01) |
| G05D 1/00 | (2006.01) |
| G05D 1/02 | (2006.01) |
| B62D 15/02 | (2006.01) |

(52) U.S. Cl.
CPC ....... G05D 1/0088 (2013.01); B60W 30/0953 (2013.01); B62D 15/025 (2013.01); G05D 1/0055 (2013.01); G05D 1/0214 (2013.01); G05D 2201/0213 (2013.01)

(58) Field of Classification Search
CPC .. G05D 1/0088; G05D 1/0055; G05D 1/0214; G05D 2201/0213; B60W 30/0953; B62D 15/025
See application file for complete search history.

(56) References Cited

U.S. PATENT DOCUMENTS

| | | | |
|---|---|---|---|
| 8,996,045 B2* | 3/2015 | Bowman | G01C 21/26 |
| | | | 455/456.1 |
| 9,625,911 B2* | 4/2017 | Lee | G05D 1/0214 |
| 9,696,177 B2* | 7/2017 | Sasaki | G01C 21/3697 |
| 10,000,237 B2* | 6/2018 | Katoh | B62D 6/00 |
| 2010/0121576 A1* | 5/2010 | Aso | G01S 13/726 |
| | | | 701/301 |
| 2010/0241714 A1* | 9/2010 | Aono | H04M 1/72552 |
| | | | 709/206 |
| 2012/0158712 A1* | 6/2012 | Karanjkar | G06F 17/30241 |
| | | | 707/724 |
| 2014/0240115 A1* | 8/2014 | Igarashi | B60W 30/08 |
| | | | 340/435 |
| 2015/0175162 A1* | 6/2015 | Nakadori | G01S 7/41 |
| | | | 701/96 |

(Continued)

Primary Examiner — Peter D Nolan
(74) Attorney, Agent, or Firm — Womble Bond Dickinson (US) LLP

(57) ABSTRACT

A control command is estimated based on a target position in view of a current speed and a current position of the ADV. Based on the estimated control command, a range of confidence positions that the ADV may potentially reach is determined. The range of confidence positions is examined to determine whether the range of confidence positions is within a safety zone, where the safety zone is determined based on the perception data that perceives a driving environment surrounding the ADV at the point in time. If the potential positions the ADV may reaches is within the safety zone, the estimated control command is then applied to the ADV. If the range of confidence positions is outside of the safety zone, another control command is estimated and the above process is repeatedly performed until the range of confidence positions falls within the safety zone.

24 Claims, 11 Drawing Sheets

(56) References Cited

U.S. PATENT DOCUMENTS

| | | | |
|---|---|---|---|
| 2016/0129907 A1* | 5/2016 | Kim | B60W 30/09 |
| | | | 701/26 |
| 2016/0132058 A1* | 5/2016 | Lee | G05D 1/0214 |
| | | | 701/26 |
| 2016/0195407 A1* | 7/2016 | Sasaki | G01C 21/3697 |
| | | | 701/36 |
| 2017/0132334 A1* | 5/2017 | Levinson | G06F 17/5009 |
| 2017/0166254 A1* | 6/2017 | Katoh | B62D 6/00 |
| 2018/0043931 A1* | 2/2018 | Gupta | B62D 5/0457 |
| 2018/0061237 A1* | 3/2018 | Erickson | G08G 1/163 |
| 2018/0074507 A1* | 3/2018 | Gao | G05D 1/0214 |
| 2018/0178783 A1* | 6/2018 | Saiki | B60W 30/09 |
| 2018/0237007 A1* | 8/2018 | Adam | B60W 30/12 |
| 2018/0244310 A1* | 8/2018 | Pursifull | B62D 6/10 |
| 2018/0292825 A1* | 10/2018 | Smolyanskiy | B62D 15/025 |
| 2018/0304890 A1* | 10/2018 | Sone | B60W 30/10 |
| 2018/0308360 A1* | 10/2018 | Regmi | G08G 1/0965 |

* cited by examiner

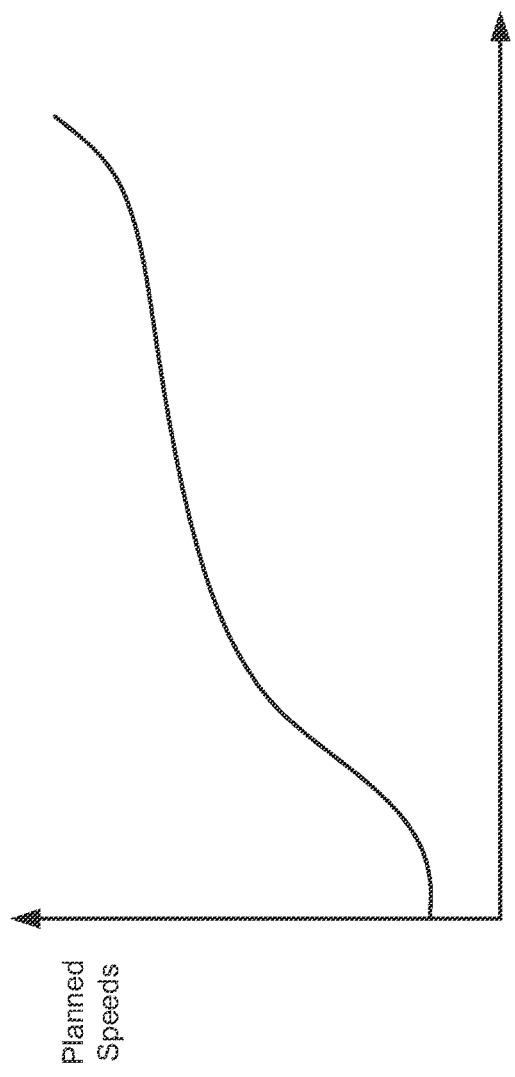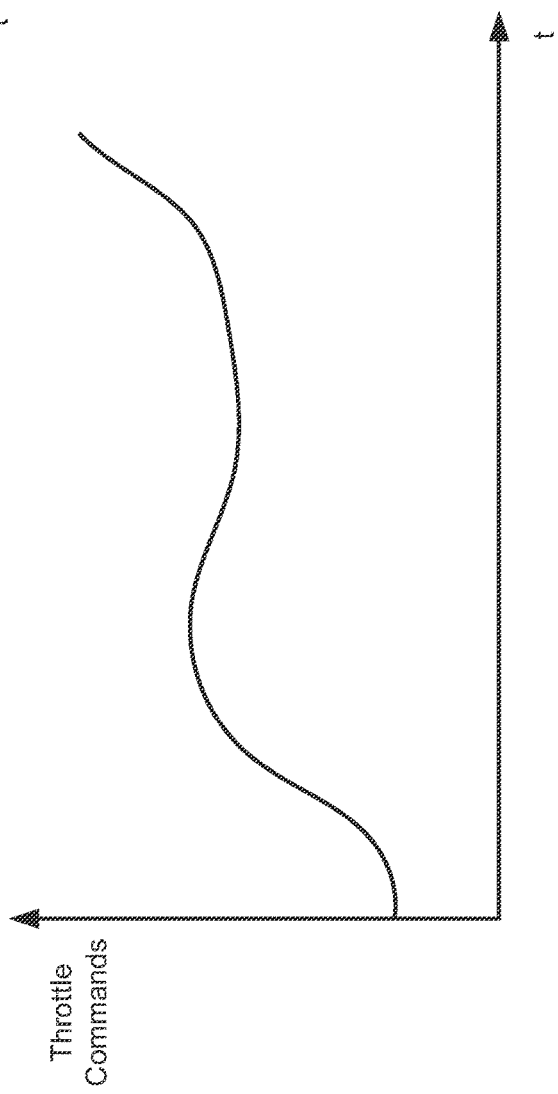

| Current Speed | Moving Angle | Steering % | Confidence Range |
|---|---|---|---|
| 20 mph | 0.6 radian | 20% | +/- 0.1 radian |
| ... | ... | ... | ... |
| ... | ... | ... | ... |
| 851 | 852 | 853 | 854 |

CONTROL DOMINATED PLANNING AND CONTROL SYSTEM FOR AUTONOMOUS DRIVING VEHICLES

TECHNICAL FIELD

Embodiments of the present invention relate generally to operating autonomous vehicles. More particularly, embodiments of the invention relate to control dominated planning and control for autonomous driving vehicles.

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

Motion planning and control are critical operations in autonomous driving. Conventional autonomous driving techniques are a planning dominated in common planning and control system, which means planning phase decides the path and speed while the control phase only executes it. FIG. 1A shows planned speeds for an autonomous driving vehicle as planned by a planning module. However, such a design results in an inevitable oscillation in control, which may leads to uncomfortable to the passengers as shown in FIG. 1B. As shown in FIG. 1B, the throttle commands according to the planned speeds as shown in FIG. 1A are not smooth or linear, which may cause uncomfortable to the passengers.

BRIEF DESCRIPTION OF THE DRAWINGS

Embodiments of the invention are illustrated by way of example and not limitation in the figures of the accompanying drawings in which like references indicate similar elements.

FIGS. 1A and 1B are diagram illustrating speed control commands and responses from a vehicle.

FIGS. 8A and 8B show command estimation data structures according to certain embodiments of the invention.

DETAILED DESCRIPTION

Figure 2:
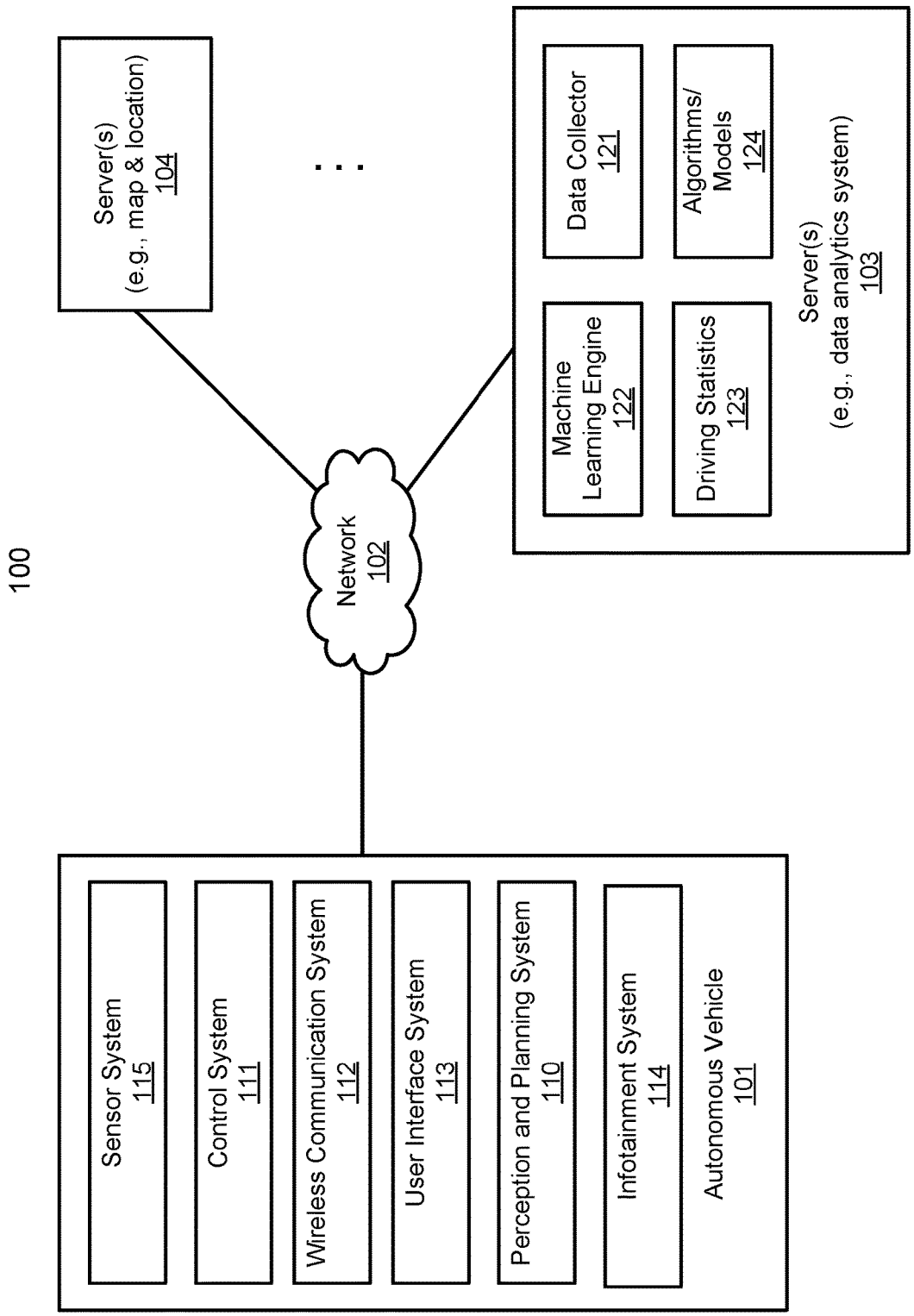
FIG. 2 is a block diagram illustrating a networked system according to one embodiment of the invention.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

According to some embodiments, a control dominated system is configured to maximize the comfortableness of passengers. The system focuses on the comfort level of the passengers riding within an autonomous driving vehicle (ADV) by tolerating the precision in path or position of the ADV as long as such a tradeoff does not render the ADV in an unsafe situation in view of the driving environment surrounding the ADV. The system simulates how a human driver would behavior under the similar situation. Typically, a human driver would apply a control command by stepping on a throttle pedal or a brake pedal and then decide whether the vehicle is moving too fast, too slow, or too close to an obstacle (e.g., pedestrian, another vehicle, a physical object such as a building). If so, the driver would then adjust the pressure applied to the throttle pedal or brake pedal, or adjust turning of the steering wheel, so that the ADV reaches a desired position.

In one embodiment, in response to a target position for an ADV, a control command (e.g., speed control command, steering control command) is estimated based on the target position in view of a current speed and a current position of the ADV. Based on the estimated control command, a range of confidence positions is determined of which the ADV may potentially reach. The range of confidence positions is examined to determine whether the range of confidence positions is within a safety zone. The safety zone is determined based on the perception data that perceives a driving environment surrounding the ADV at the point in time. If it is determined that the potential positions the ADV may reach in response to the estimated control command is within the safety zone, the estimated control command is then applied to the ADV. If it is determined that the range of confidence positions is outside of the safety zone, another control command is estimated, for example, adjusted based on the previously estimated control command, and the above process is repeatedly performed until the range of confidence positions falls within the safety zone.

In one embodiment, the system performs a lookup operation in a command estimation table based on the information derived from the target position, current position, and current speed of the ADV. The command estimation table includes a number of entries. Each entry corresponds to one of a number of estimated control commands and each estimated control command is associated with a range of confidence positions. Such a range of confidence positions can be determined or trained offline by a data analytics system based on a large amount of driving statistics, for example, by a variety of human drivers using a variety of types of vehicles.

In one embodiment, once a control module estimates a control command and determines a range of confidence positions the ADV might reach, the information concerning the confidence positions is then fed back to the planning module. The planning module determines whether the range of confidence positions falls within a safety zone, where the safety zone is created by the planning module based on perception data provided by a perception module perceiving the driving environment surrounding the ADV. The communications between the planning module and the control module are performed back and forth until a proper control command is found. If there is no appropriate control command estimated after a number of iterations, the control module falls back to the conventional approach to determine control commands based on the targets received from the planning module and attempts to drive the ADV along the path provided by the planning module as close as possible.

FIG. 2 is a block diagram illustrating an autonomous vehicle network configuration according to one embodiment of the invention. Referring to FIG. 2, network configuration 100 includes autonomous vehicle 101 that may be communicatively coupled to one or more servers 103-104 over a network 102. Although there is one autonomous vehicle shown, multiple autonomous vehicles can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) severs, or location servers, etc.

An autonomous vehicle refers to a vehicle that can be configured to in an autonomous mode in which the vehicle navigates through an environment with little or no input from a driver. Such an autonomous vehicle can include a sensor system having one or more sensors that are configured to detect information about the environment in which the vehicle operates. The vehicle and its associated controller(s) use the detected information to navigate through the environment. Autonomous vehicle 101 can operate in a manual mode, a full autonomous mode, or a partial autonomous mode.

In one embodiment, autonomous vehicle 101 includes, but is not limited to, perception and planning system 110, vehicle control system 111, wireless communication system 112, user interface system 113, infotainment system 114, and sensor system 115. Autonomous vehicle 101 may further include certain common components included in ordinary vehicles, such as, an engine, wheels, steering wheel, transmission, etc., which may be controlled by vehicle control system 111 and/or perception and planning system 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 3:
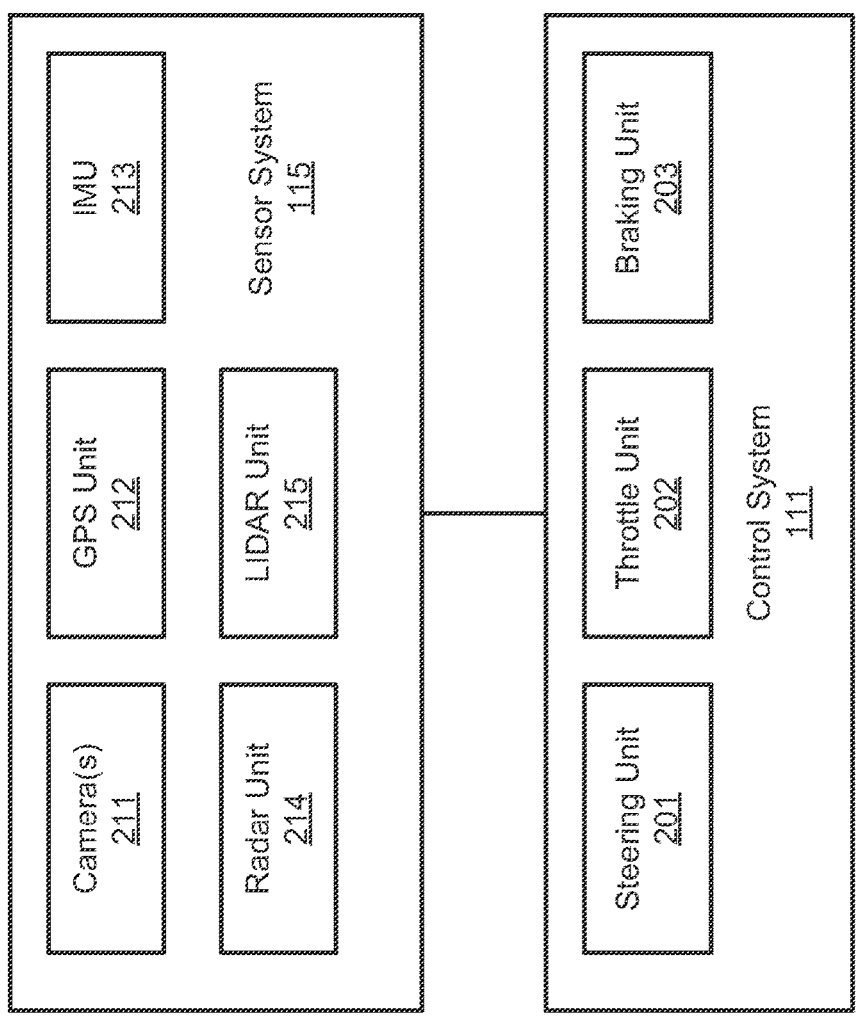
FIG. 3 is a block diagram illustrating an example of an autonomous vehicle according to one embodiment of the invention.

Referring now to FIG. 3, in one embodiment, sensor system 115 includes, but it is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the autonomous vehicle. IMU unit 213 may sense position and orientation changes of the autonomous vehicle based on inertial acceleration. Radar unit 214 may represent a system that utilizes radio signals to sense objects within the local environment of the autonomous vehicle. In some embodiments, in addition to sensing objects, radar unit 214 may additionally sense the speed and/or heading of the objects. LIDAR unit 215 may sense objects in the environment in which the autonomous vehicle is located using lasers. LIDAR unit 215 could include one or more laser sources, a laser scanner, and one or more detectors, among other system components. Cameras 211 may include one or more devices to capture images of the environment surrounding the autonomous vehicle. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the autonomous vehicle. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn control the speed and acceleration of the vehicle. Braking unit 203 is to decelerate the vehicle by providing friction to slow the wheels or tires of the vehicle. Note that the components as shown in FIG. 3 may be implemented in hardware, software, or a combination thereof.

Referring back to FIG. 2, wireless communication system 112 is to allow communication between autonomous vehicle 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyword, a touch screen display device, a microphone, and a speaker, etc.

Some or all of the functions of autonomous vehicle 101 may be controlled or managed by perception and planning system 110, especially when operating in an autonomous driving mode. Perception and planning system 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, perception and planning system 110 may be integrated with vehicle control system 111.

For example, a user as a passenger may specify a starting location and a destination of a trip, for example, via a user interface. Perception and planning system 110 obtains the trip related data. For example, perception and planning system 110 may obtain location and route information from an MPOI server, which may be a part of servers 103-104. The location server provides location services and the MPOI server provides map services and the POIs of certain locations. Alternatively, such location and MPOI information may be cached locally in a persistent storage device of perception and planning system 110.

While autonomous vehicle 101 is moving along the route, perception and planning system 110 may also obtain real-time traffic information from a traffic information system or server (TIS). Note that servers 103-104 may be operated by a third party entity. Alternatively, the functionalities of servers 103-104 may be integrated with perception and planning system 110. Based on the real-time traffic information, MPOI information, and location information, as well as real-time local environment data detected or sensed by sensor system 115 (e.g., obstacles, objects, nearby vehicles), perception and planning system 110 can plan an optimal route and drive vehicle 101, for example, via control system 111, according to the planned route to reach the specified destination safely and efficiently.

Server 103 may be a data analytics system to perform data analytics services for a variety of clients. In one embodiment, data analytics system 103 includes data collector 121 and machine learning engine 122. Data collector 121 collects driving statistics 123 from a variety of vehicles, either autonomous vehicles or regular vehicles driven by human drivers. Driving statistics 123 include information indicating the driving commands (e.g., throttle, brake, steering commands) issued and responses of the vehicles (e.g., speeds, accelerations, decelerations, directions) captured by sensors of the vehicles at different points in time. Driving statistics 123 may further include information describing the driving environments at different points in time, such as, for example, routes (including starting and destination locations), MPOIs, road conditions, weather conditions, etc.

Based on driving statistics 123, machine learning engine 122 performs or trains a set of rules, algorithms, and/or predictive models 124 for a variety of purposes. In one embodiment, rules 124 include a command estimation table or data structure for estimating a control command and its associated range of confidence positions. The command estimation table may be created based on driving statistics 123, which have been collected from a variety of vehicles driven by a variety of human drivers or autonomous driving systems. A command estimation table may be created and configured for each type of vehicles. The command estimation tables are then uploaded onto the corresponding ADVs to be utilized at real-time to estimate control commands.

Figure 4:
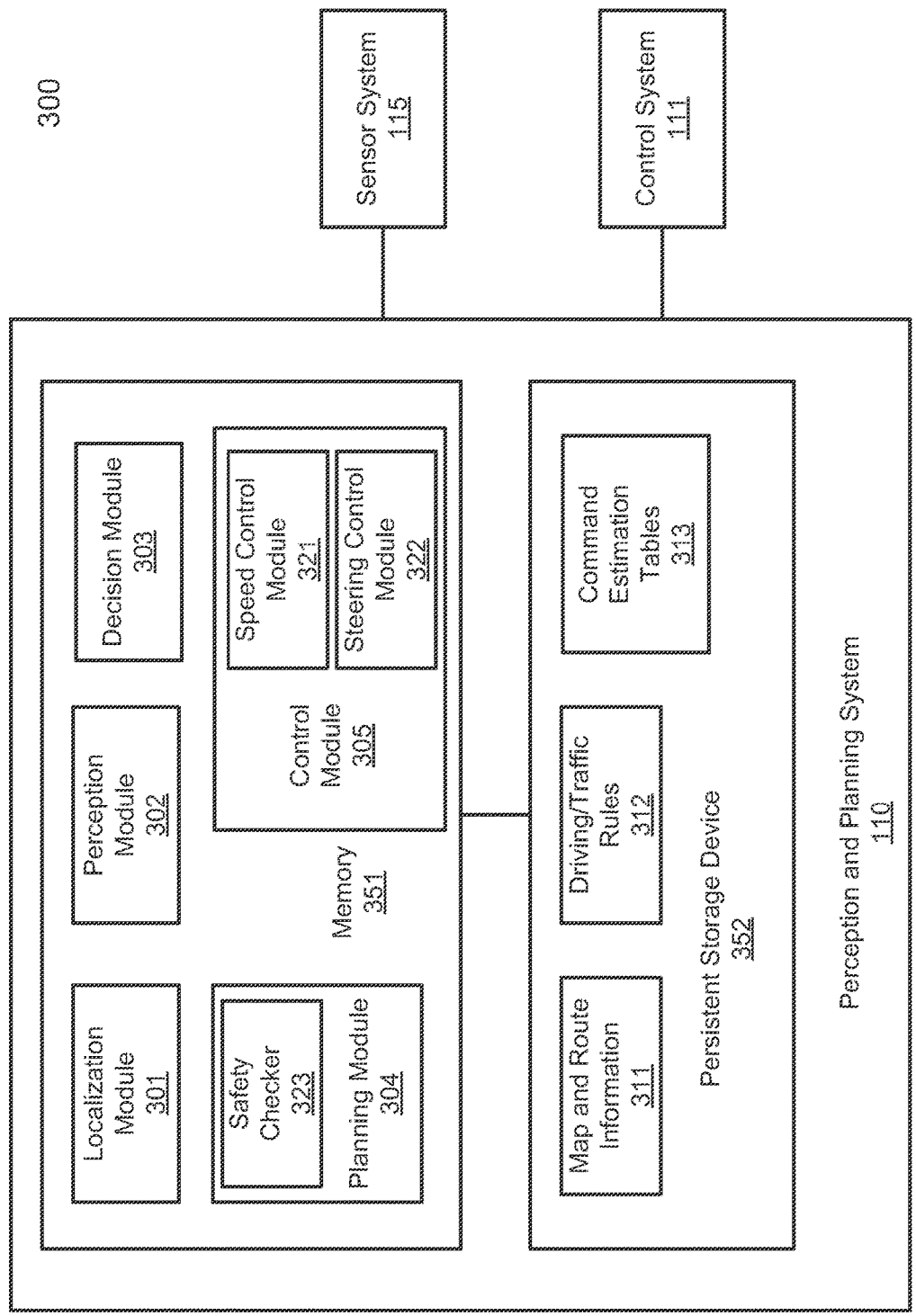
FIG. 4 is a block diagram illustrating an example of a perception and planning system used with an autonomous vehicle according to one embodiment of the invention.

FIG. 4 is a block diagram illustrating an example of a perception and planning system used with an autonomous vehicle according to one embodiment of the invention. System 300 may be implemented as a part of autonomous vehicle 101 of FIG. 2 including, but is not limited to, perception and planning system 110, control system 111, and sensor system 115. Referring to FIG. 4, perception and planning system 110 includes, but is not limited to, localization module 301, perception module 302, decision module 303, planning module 304, and control module 305.

Some or all of modules 301-305 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 3. Some of modules 301-305 may be integrated together as an integrated module.

Localization module 301 determines a current location of autonomous vehicle 300 (e.g., leveraging GPS unit 212) and manages any data related to a trip or route of a user. Localization module 301 (also referred to as a map and route module) manages any data related to a trip or route of a user. A user may log in and specify a starting location and a destination of a trip, for example, via a user interface. Localization module 301 communicates with other components of autonomous vehicle 300, such as map and route information 311, to obtain the trip related data. For example, localization module 301 may obtain location and route information from a location server and a map and POI (MPOI) server. A location server provides location services and an MPOI server provides map services and the POIs of certain locations, which may be cached as part of map and route information 311. While autonomous vehicle 300 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration (e.g., straight or curve lanes), traffic light signals, a relative position of another vehicle, a pedestrian, a building, crosswalk, or other traffic related signs (e.g., stop signs, yield signs), etc., for example, in a form of an object.

Perception module 302 may include a computer vision system or functionalities of a computer vision system to process and analyze images captured by one or more cameras in order to identify objects and/or features in the environment of autonomous vehicle. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

For each of the objects, decision module 303 makes a decision regarding how to handle the object. For example, for a particular object (e.g., another vehicle in a crossing route) as well as its metadata describing the object (e.g., a speed, direction, turning angle), decision module 303 decides how to encounter the object (e.g., overtake, yield, stop, pass). Decision module 303 may make such decisions according to a set of rules such as traffic rules or driving rules 312, which may be stored in persistent storage device 352.

Based on a decision for each of the objects perceived, planning module 304 plans a path or route for the autonomous vehicle, as well as driving parameters (e.g., distance, speed, and/or turning angle). That is, for a given object, decision module 303 decides what to do with the object, while planning module 304 determines how to do it. For example, for a given object, decision module 303 may decide to pass the object, while planning module 304 may determine whether to pass on the left side or right side of the object. Planning and control data is generated by planning module 304 including information describing how vehicle 300 would move in a next moving cycle (e.g., next route/path segment). For example, the planning and control data may instruct vehicle 300 to move 10 meters at a speed of 30 mile per hour (mph), then change to a right lane at the speed of 25 mph.

Based on the planning and control data, control module 305 controls and drives the autonomous vehicle, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, and turning commands) at different points in time along the path or route.

Note that decision module 303 and planning module 304 may be integrated as an integrated module. Decision module 303/planning module 304 may include a navigation system or functionalities of a navigation system to determine a driving path for the autonomous vehicle. For example, the navigation system may determine a series of speeds and directional headings to effect movement of the autonomous vehicle along a path that substantially avoids perceived obstacles while generally advancing the autonomous vehicle along a roadway-based path leading to an ultimate destination. The destination may be set according to user inputs via user interface system 113. The navigation system may update the driving path dynamically while the autonomous vehicle is in operation. The navigation system can incorporate data from a GPS system and one or more maps so as to determine the driving path for the autonomous vehicle.

Decision module 303/planning module 304 may further include a collision avoidance system or functionalities of a collision avoidance system to identify, evaluate, and avoid or otherwise negotiate potential obstacles in the environment of the autonomous vehicle. For example, the collision avoidance system may effect changes in the navigation of the autonomous vehicle by operating one or more subsystems in control system 111 to undertake swerving maneuvers, turning maneuvers, braking maneuvers, etc. The collision avoidance system may automatically determine feasible obstacle avoidance maneuvers on the basis of surrounding traffic patterns, road conditions, etc. The collision avoidance system may be configured such that a swerving maneuver is not undertaken when other sensor systems detect vehicles, construction barriers, etc. in the region adjacent the autonomous vehicle that would be swerved into. The collision avoidance system may automatically select the maneuver that is both available and maximizes safety of occupants of the autonomous vehicle. The collision avoidance system may select an avoidance maneuver predicted to cause the least amount of acceleration in a passenger cabin of the autonomous vehicle.

According to one embodiment, control module 305 includes speed control module 321 and steering control module 322. Speed control module 321 is configured to generate speed control commands (e.g., throttle, brake commands) to control the speeds of the ADV. Steering control module 322 is configured to generate steering control commands to control steering of the ADV (e.g., changing a moving direction of the vehicle). In one embodiment, in response to target information (e.g., target position, target speed, target steering angle) received from planning module 304, speed control module 321 estimates a speed control command based on the target information and determines a range of confidence positions that the ADV may potentially end up if the estimated speed control command is to be executed. Similarly, steering control module 322 estimates a steering control command and its range of confidence positions that the ADV may potentially reach if the estimated steering control command is to be executed.

Figure 5A:
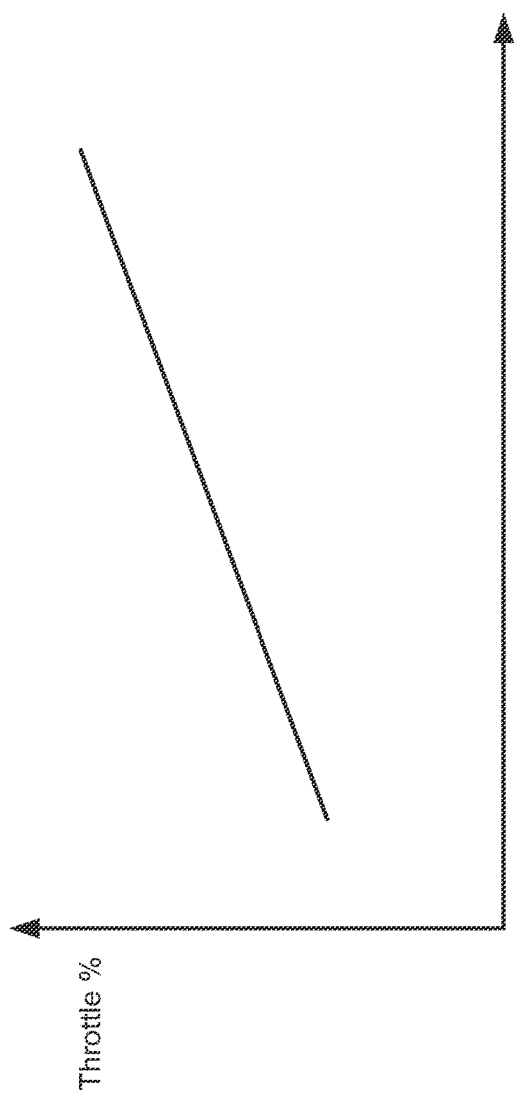
FIGS. 5A and 5B are diagram illustrating speed control commands and the vehicle responses according to certain embodiments of the invention.
Figure 5B:
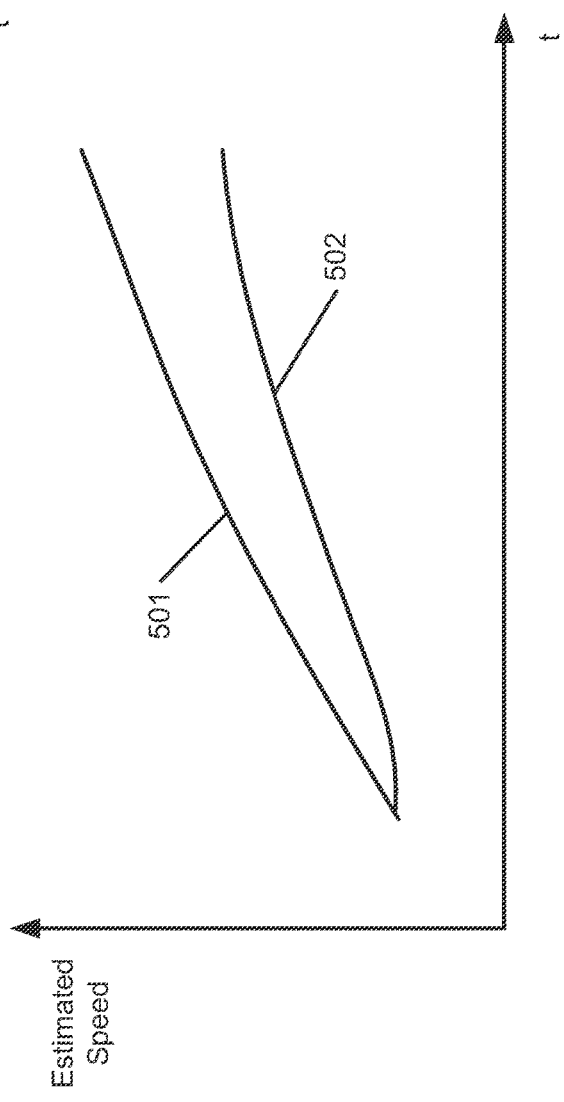
Figure 6A:
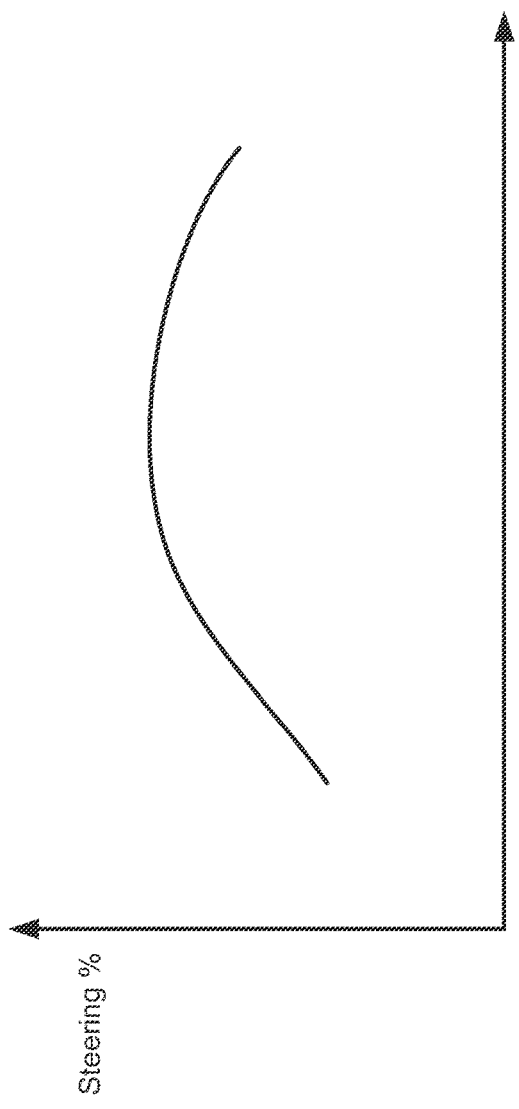
FIGS. 6A and 6B are diagram illustrating steering control commands and the vehicle responses according to certain embodiments of the invention.
Figure 6B:
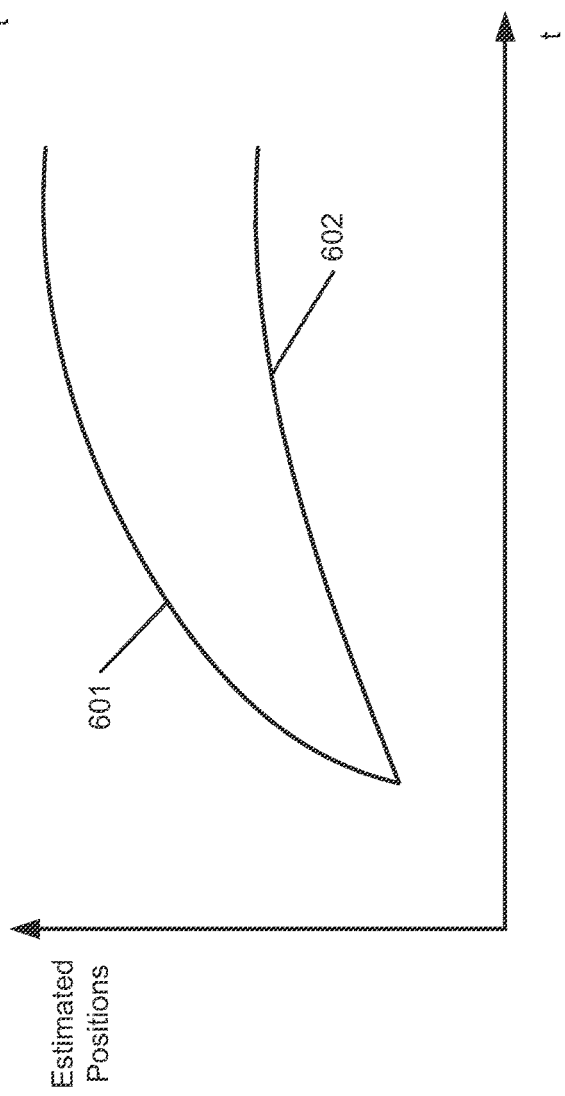

Referring now to FIGS. 5A and 5B, FIG. 5A shows a curve representing speed control commands in a form of throttle percentages over a period of time that are estimated by speed control module 321. The curve is a relatively linear curve similar to how a human driver would apply pressure on a throttle pedal. FIG. 5B shows the estimated speeds of the vehicle may achieve, in response to the estimated speed control command as shown in FIG. 5A. As shown in FIG. 5B, the speed of the ADV may vary within curve 501 and curve 502. The area between curves 501 and 502 represents a range of confidence speeds that the vehicle may end up. The range of confidence speeds can be utilized to determine a range of confidence positions with respect to a target position in view of the current position of the ADV over a predetermined time period. The target position and the time period to reach the target position may be a part of the target information received from planning module 304. The range of confidence positions is also referred to as a range of confidence positions representing a range of positions in which it is relatively certain or confident that the ADV would likely ends up. Similarly, referring now to FIGS. 6A-6B, FIG. 6A shows a curve representing steering control commands in a form of steering angle percentages and FIG. 6B shows an area between curves 601 and 602 representing a range of confidence positions the ADV potentially reaches in response to the estimated steering commands.

Referring back to FIG. 4, control module 305 feeds the confidence position information back to planning module 304. In one embodiment, planning module 304 further includes safety checker module 323 to check whether a range of confidence positions representing potential positions that the ADV may reach is safe in view of a safety zone. The safety checker module 323 may determine the safety zone at the point in time based on the perception data perceiving a driving environment surrounding the ADV. The safety zone represents a range of positions within which the ADV is safe. That is, within the safety zone, the ADV will not be in a potential dangerous situation (e.g., colliding with another vehicle, pedestrian, or an object). Safety checker module 323 compares the range of confidence positions with the safety zone to determine whether the confidence positions are within the safety zone. If the range of confidence positions falls within the safety zone, the estimated control command (e.g., throttle, brake, or steering commands) is then applied to the ADV. Otherwise, the estimated control command will be adjusted and the above process may be repeatedly performed to attempt finding an appropriate control command that is safe to operate the ADV.

Figure 7:
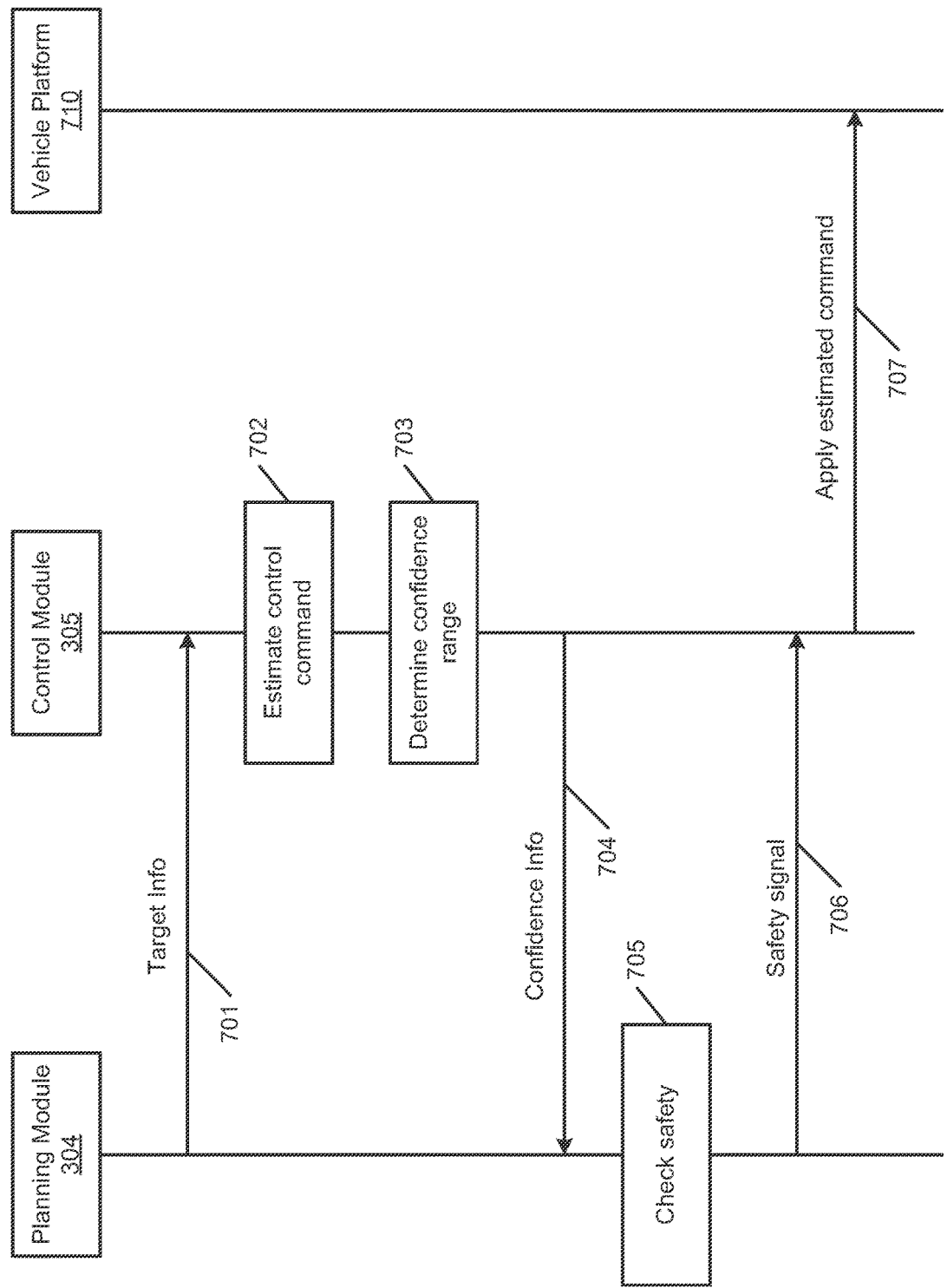
FIG. 7 is a processing flow diagram illustrating communications between a planning module and a control module according to one embodiment of the invention.

FIG. 7 is a processing flow diagram illustrating communications between a planning module and a control module according to one embodiment of the invention. Referring to FIG. 7, in operation 701, planning module 304 plans and sends planning and control data to control module 305. The planning and control data includes target information the ADV would be expected to reach, which may include a target position, a target speed, and/or a target steering angle, etc. Alternatively, the planning and control data specifies a target position that ADV reaches within a period of time or changing lane within a period of time, etc., and it is up to control module 305 to determine the target speed or a steering angle needed to reach the planned target. In response to the target information, in operation 702, control module 305 (e.g., speed control module 321 and/or steering control module 322) estimates a control command (e.g., speed control command, steering control command) based on the target information. In operation 703, control module 305 determines a range of confidence positions that the ADV potentially reaches in response to the estimated control command.

Figure 8A:
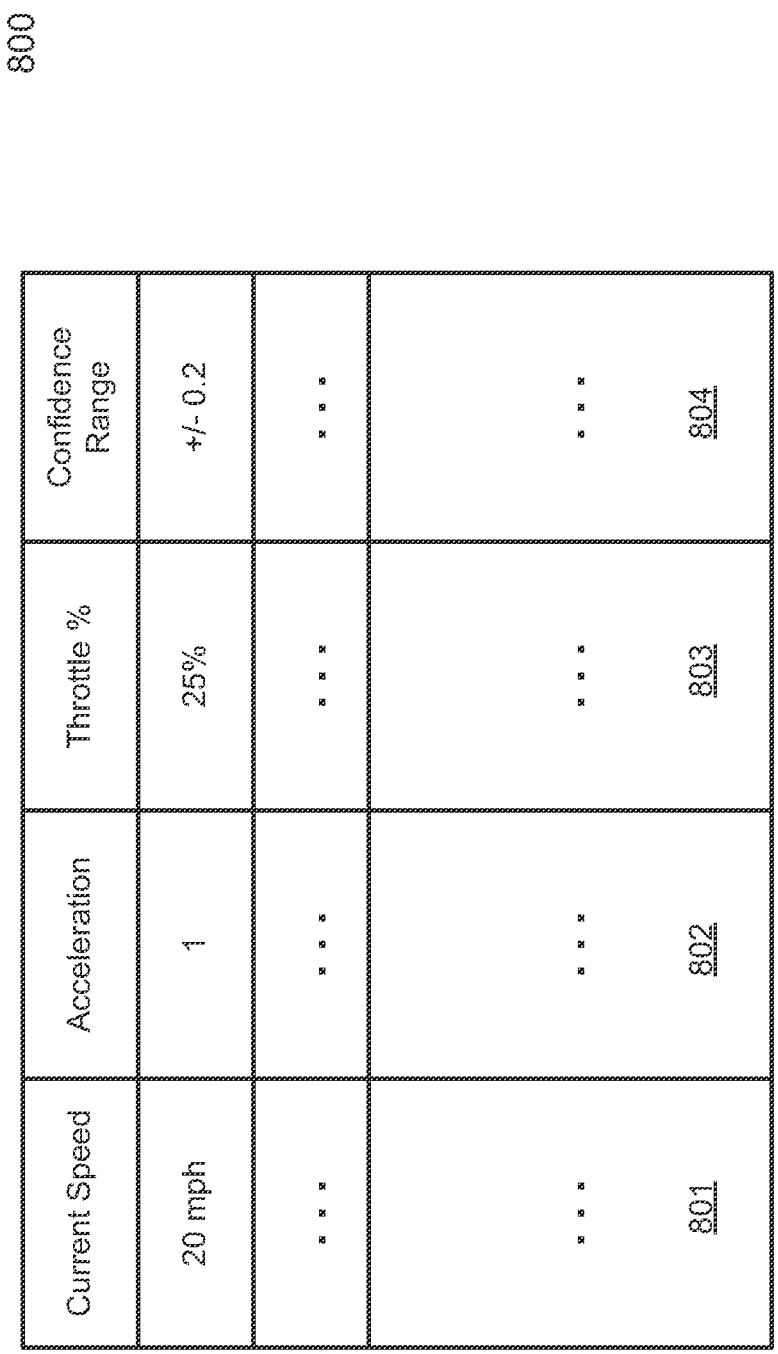

As described above, a control command can be a speed control command or a steering control command. In estimating a speed control command, according to one embodiment, speed control module 321 performs a lookup operation in a speed command estimation table or data structure, which may be a part of rules 124. FIG. 8A shows an example of a speed control estimation table according to one embodiment of the invention. Referring now to FIG. 8A, speed command estimation table 800 includes a number of entries. Each entry maps current speed 801 of the ADV and acceleration 802 required to reach a target speed or a target position to speed control command 803, in this example, in a form of throttle percentage. For example, in response to a target position to be reached within period of time (Δt), a distance (S) from a current position to the target position can be calculated as S=target position−current position. A target speed (Vt) can then be calculated as Vt=S/Δt. An acceleration (A) can be calculated in view of a current speed (Vc) as: A=(Vt$^2$−Vc$^2$)/2S. Thereafter, based on the current speed Vc and the acceleration A, an estimated control command can be determined by looking up in command estimation table 800. Similarly, for deceleration (e.g., acceleration 802 is negative), speed control command 803 would be a brake command in a form of a brake percentage.

For speed control command 803, it is associated with a range of confidence values 804, also referred to as a confidence range, representing an error margin for the corresponding control command. In this example, the range of confidence values 804 represents a range of confidence accelerations for acceleration 802. In this example, assuming acceleration 802 is 1 meters per square second (m/s$^2$), for estimated speed control command 803, the range of confidence values 804 is +/−0.2 m/s$^2$. Thus, the potential acceleration for the speed control command of 25% throttle would be in a range of 0.8-1.2 m/s$^2$. Based on the current speed 801, required acceleration 802, and the range of confidence values 804, if speed control command 803 is applied to the ADV, a range of confidence positions that the ADV potentially reaches can be estimated.

In one embodiment, command estimation table 800 may be implemented in two tables: 1) command estimation table and 2) confidence estimation table. In this configuration, the command estimation table would include columns 801-803, while confidence estimation table would include columns 802-804. Thus, the command estimation table maps particular vehicle speed 801 and acceleration 802 to speed control command 803. Once the speed control command has been estimated, confidence estimation table can be utilized to estimate the confidence range 804 based on the acceleration 802 and the estimated speed control command 803.

Similarly, in estimating a steering command, a steering command estimation table or data structure can be utilized as shown in FIG. 8B. Referring to FIG. 8B, steering command estimation table 850 includes a number of entries. Each entry maps current speed of the vehicle 851 and moving steering angle 852 required to reach a target steering angle to steering command 853, for example, in a form of steering angle percentage. For steering control command 853, it is associated with confidence range 854 representing an error margin. In this example, confidence range 854 represents a range of confidence steering angles for moving angle 852. Based on the current speed 851, required moving angle 852, and the confidence range 854, if steering control command 853 is applied to the ADV, a range of confidence positions that the ADV potentially reaches can be estimated. Such a range of confidence values 804 and 854 can be determined or trained offline by a data analytics system based on a large amount of driving statistics, for example, by a variety of human drivers using a variety of types of vehicles.

In one embodiment, command estimation table 850 may be implemented in two tables: 1) command estimation table and 2) confidence estimation table. In this configuration, the command estimation table would include columns 851-853, while confidence estimation table would include columns 852-854. Thus, the command estimation table maps particular vehicle speed 851 and moving angle 852 to steering control command 853. Once the steering control command has been estimated, the confidence estimation table can be utilized to estimate the confidence range 854 based on the moving angle 852 and the estimated steering control command 853.

Referring back to FIG. 7, in operation 704, control module 305 transmits the confidence positions to planning module 304. In response to the confidence positions, in operation 705, planning module 304 determines whether the range of confidence positions falls within a safety zone associated with the ADV. Alternatively, control module 305 can simply transmits the confidence range to planning module 304 and planning module 304 determines the range of confidence positions. In one embodiment, the safety zone is dynamically determined based on the perception data that perceives a driving environment surrounding the ADV at the point in time. In other words, planning module 304 determines, given the range of positions that the ADV may potentially reach, whether the ADV would potentially collide with an object (e.g., another vehicle, a pedestrian, an obstacle) outside the safety zone. In operation 706, planning module 304 transmits a response or signal back to control module 305 indicating whether the estimate control command is safe. If the signal indicates that the estimated command is safe, in operation 707, control module 305 applies the estimated control command to vehicle platform 700.

If it is determined that the estimated control command is unsafe based on the safety signal, control module 305 adjusts (e.g., increment or decrement by a delta value) the estimated control command and the operations 702-706 may be repeatedly performed for the adjusted estimated command until the estimated command is safe or until a number of iterations reaches a predetermined threshold. If the number of iterations reaches the predetermined threshold and there is no appropriate or safe control command estimated, control module 305 may fall back to the conventional approach, i.e., the planning dominated approach. In the planning dominated approach, control module generates a control command based on the target information received from planning module 304 via operation 701 according to a set of rules such as map and route information 311 and/or driving/traffic rules 312. In such an approach, control module 305 attempts to control the ADV to match the route or path planned by planning module 304 as close as possible.

Figure 9:
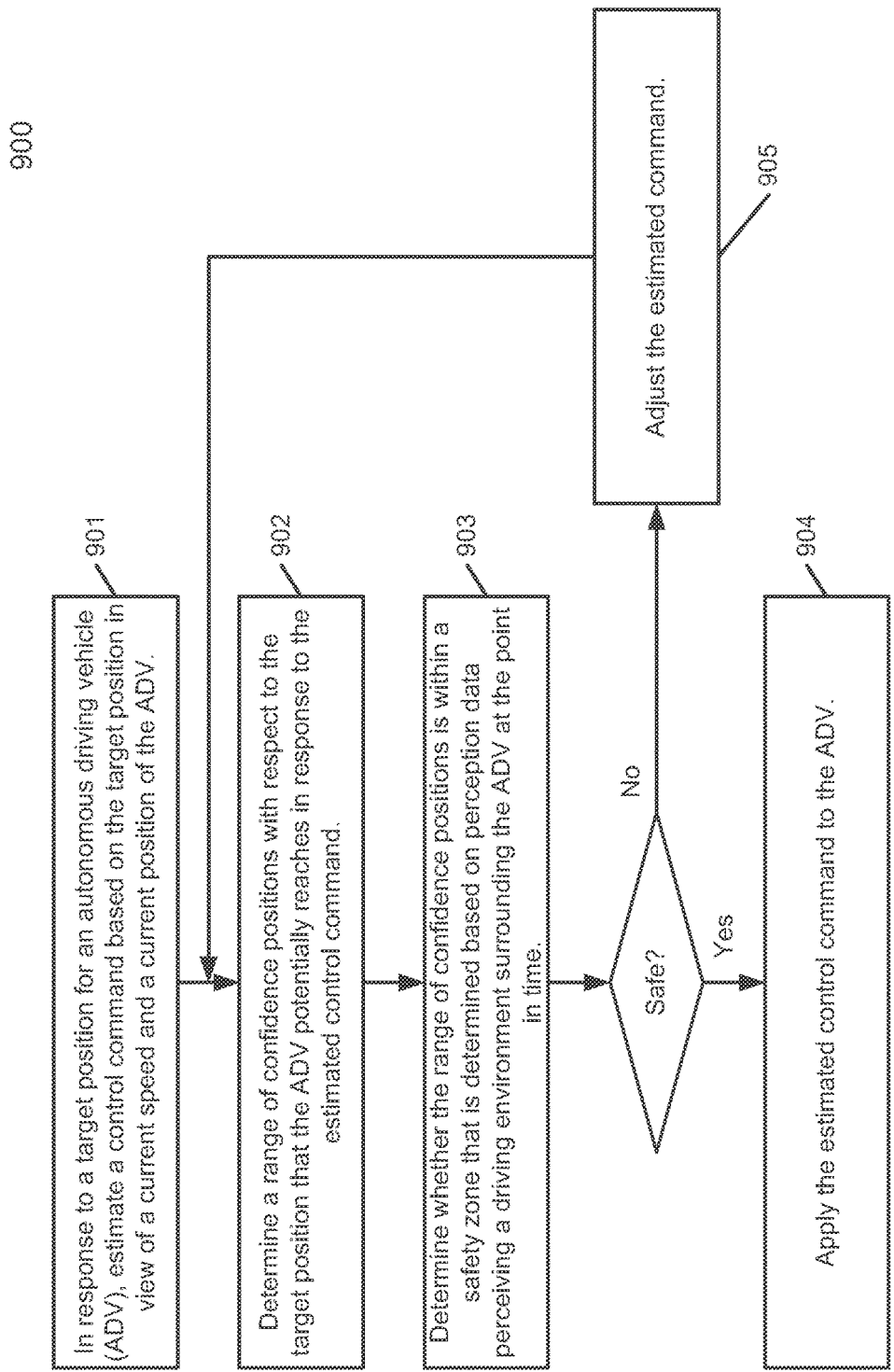
FIG. 9 is a flow diagram illustrating a process of operating an autonomous driving vehicle according to one embodiment of the invention.

FIG. 9 is a flow diagram illustrating a process for operating an autonomous driving vehicle according to one embodiment of the invention. Process 900 may be performed by processing logic which may include software, hardware, or a combination thereof. For example, process 900 may be performed by planning module 304 and/or control module 305. Referring to FIG. 9, in operation 901, in response to a target position for an ADV and time required to reach the target position, processing logic estimates a control command based on the target position in view of a current speed and a current position of the ADV. In one embodiment, processing logic looks up in a command estimation table based on the current speed and an acceleration in speeds or steering angles to obtain an estimated control command (e.g., speed control command or steering control command).

In operation 902, processing logic determines a range of confidence positions with respect to the target position that the ADV may potentially reach. The range of confidence positions is configured corresponding to the estimated control command in question. In operation 903, processing logic determines whether the range of confidence positions is within a safety zone with respect to the target position. The safety zone may be determined at the point in time based on the perception data perceiving the driving environment surrounding the ADV. If it is determined that the range of confidence positions falls within the safety zone, in operation 904, the estimated control command is then applied to the ADV. Otherwise, in operation 905, the estimated control command is adjusted to generate a new estimated command and the above process is repeatedly performed until the range of confidence positions falls within the safety zone or a number of iterations reaches a predetermined threshold.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 10:
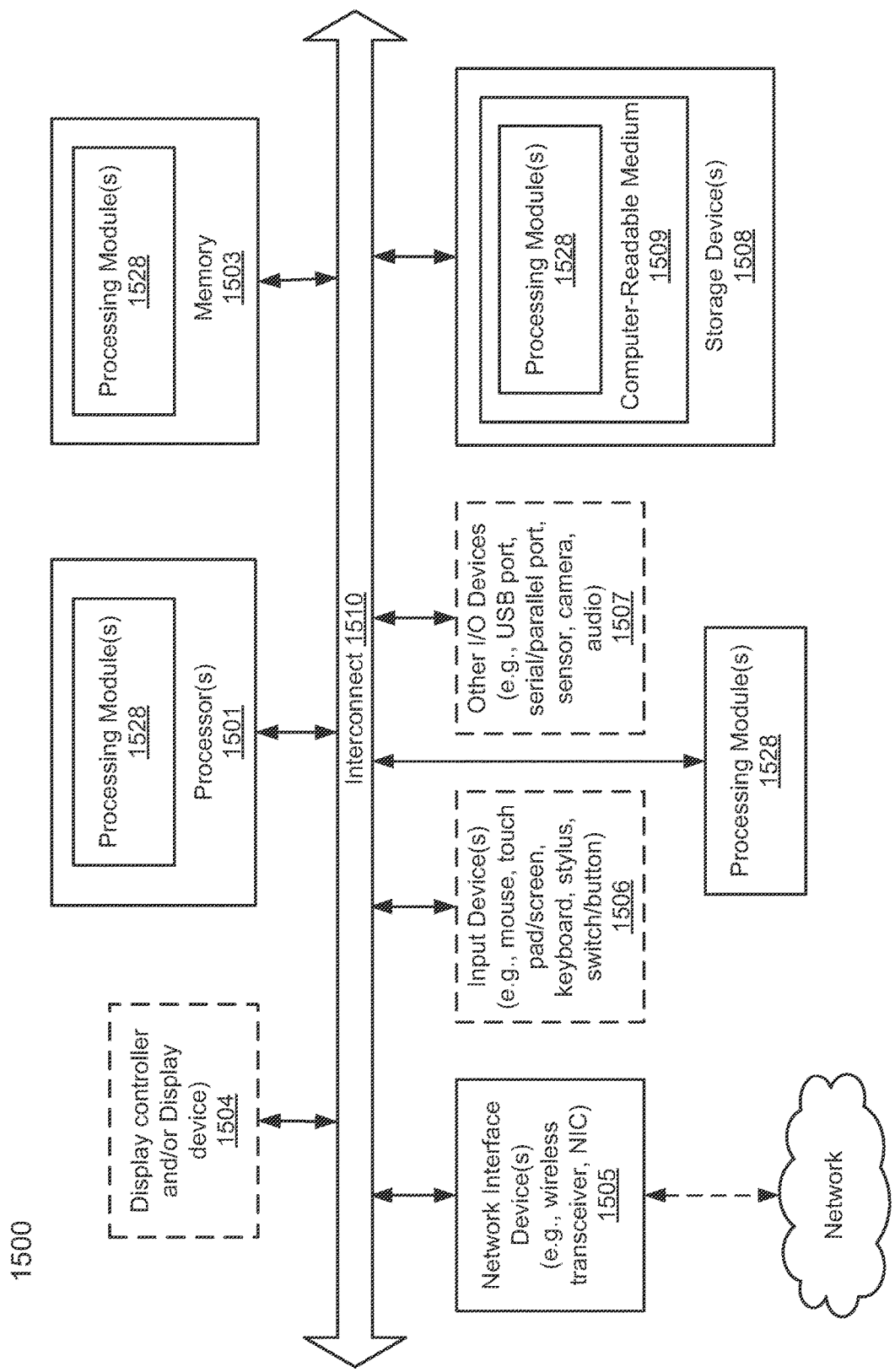
FIG. 10 is a block diagram illustrating a data processing system according to one embodiment.

FIG. 10 is a block diagram illustrating an example of a data processing system which may be used with one embodiment of the invention. For example, system 1500 may represent any of data processing systems described above performing any of the processes or methods described above, such as, for example, perception and planning system 110 or any of servers 103-104 of FIG. 2. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system.

Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a Smartwatch, a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 connected via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a graphics processor, a network processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Robot Operating System (ROS), Windows® operating system from Microsoft®, Mac OS®/iOS® from Apple, Android® from Google®, LINUX, UNIX, or other real-time or embedded operating systems.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including BIOS as well as other firmware of the system.

Storage device 1508 may include computer-accessible storage medium 1509 (also known as a machine-readable storage medium or a computer-readable medium) on which is stored one or more sets of instructions or software (e.g., module, unit, and/or logic 1528) embodying any one or more of the methodologies or functions described herein. Processing module/unit/logic 1528 may represent any of the components described above, such as, for example, planning module 304 and/or control module 305. Processing module/unit/logic 1528 may also reside, completely or at least partially, within memory 1503 and/or within processor 1501 during execution thereof by data processing system 1500, memory 1503 and processor 1501 also constituting machine-accessible storage media. Processing module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Processing module/unit/logic 1528, components and other features described herein can be implemented as discrete hardware components or integrated in the functionality of hardware components such as ASICS, FPGAs, DSPs or similar devices. In addition, processing module/unit/logic 1528 can be implemented as firmware or functional circuitry within hardware devices. Further, processing module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method for operating an autonomous driving vehicle, comprising:
   in response to a target position for an autonomous driving vehicle (ADV), estimating a control command based on the target position in view of a current speed and a current position of the ADV;
   obtaining a range of confidence positions with respect to the target position that the ADV potentially reaches in response to the estimated control command, wherein the range of confidence positions was predetermined based on prior driving statistics;
   determining whether the range of confidence positions is within a safety zone that is determined at a point in time based on perception data perceiving a driving environment surrounding the ADV; and
   applying the control command to the ADV in response to determining that the range of confidence positions is within the safety zone.

2. The method of claim 1, further comprising:
   adjusting the estimated control command, in response to determining that the range of confidence positions is outside of the safety zone; and
   iteratively performing operations of determining a range of confidence positions and determining whether the range of confidence positions is within a safety zone.

3. The method of claim 2, wherein the iteratively performed operations are performed until the range of confidence positions is within the safety zone or a number of iterative performed operations reaches a predetermined threshold.

4. The method of claim 1, wherein estimating a control command based on the target position comprises:
   calculating an acceleration required to reach the target position based on a current position and the current speed of the ADV; and
   performing a lookup operation in a command estimation table based on the current speed and the acceleration to obtain a speed control command as the estimated control command.

5. The method of claim 4, wherein the command estimation table includes a plurality of mapping entries, each mapping entry mapping an acceleration to an estimated control command.

6. The method of claim 5, wherein each mapping entry further maps a corresponding command to a particular range of confidence positions associated with the corresponding command.

7. The method of claim 1, wherein estimating a control command based on the target position comprises:
   calculating a change of steering angles required to reach the target position based on a current position and the current speed of the ADV;
   performing a lookup operation in a command estimation table based on the current speed and the required change of steering angles to locate a matching entry; and
   obtaining a steering control command as the estimated control command from the matching entry.

8. The method of claim 7, wherein the command estimation table includes a plurality of mapping entries, each mapping entry mapping a change of steering angle to an estimated control command and a particular range of confidence positions, and wherein the particular range of confidence positions is obtained from the matching entry.

9. A non-transitory machine-readable medium having instructions stored therein, which when executed by a processor, cause the processor to perform operations, the operations comprising:
   in response to a target position for an autonomous driving vehicle (ADV), estimating a control command based on the target position in view of a current speed and a current position of the ADV;
   obtaining a range of confidence positions with respect to the target position that the ADV potentially reaches in response to the estimated control command, wherein the range of confidence positions was predetermined based on prior driving statistics;
   determining whether the range of confidence positions is within a safety zone that is determined at a point in time based on perception data perceiving a driving environment surrounding the ADV; and
   applying the control command to the ADV in response to determining that the range of confidence positions is within the safety zone.

10. The machine-readable medium of claim 9, wherein the operations further comprise:
    adjusting the estimated control command, in response to determining that the range of confidence positions is outside of the safety zone; and iteratively performing operations of determining a range of confidence positions and determining whether the range of confidence positions is within a safety zone.

11. The machine-readable medium of claim 10, wherein the iteratively performed operations are performed until the range of confidence positions is within the safety zone or a number of iterative performed operations reaches a predetermined threshold.

12. The machine-readable medium of claim 9, wherein estimating a control command based on the target position comprises:
calculating an acceleration required to reach the target position based on a current position and the current speed of the ADV; and
performing a lookup operation in a command estimation table based on the current speed and the acceleration to obtain a speed control command as the estimated control command.

13. The machine-readable medium of claim 12, wherein the command estimation table includes a plurality of mapping entries, each mapping entry mapping an acceleration to an estimated control command.

14. The machine-readable medium of claim 13, wherein each mapping entry further maps a corresponding command to a particular range of confidence positions associated with the corresponding command.

15. The machine-readable medium of claim 9, wherein estimating a control command based on the target position comprises:
calculating a change of steering angles required to reach the target position based on a current position and the current speed of the ADV;
performing a lookup operation in a command estimation table based on the current speed and the required change of steering angles to locate a matching entry; and
obtaining a steering control command as the estimated control command from the matching entry.

16. The machine-readable medium of claim 15, wherein the command estimation table includes a plurality of mapping entries, each mapping entry mapping a change of steering angle to an estimated control command and a particular range of confidence positions, and wherein the particular range of confidence positions is obtained from the matching entry.

17. A data processing system, comprising:
a processor; and
a memory coupled to the processor to store instructions, which when executed by the processor, cause the processor to perform operations, the operations including
in response to a target position for an autonomous driving vehicle (ADV), estimating a control command based on the target position in view of a current speed and a current position of the ADV,
obtaining a range of confidence positions with respect to the target position that the ADV potentially reaches in response to the estimated control command, wherein the range of confidence positions was predetermined based on prior driving statistics,
determining whether the range of confidence positions is within a safety zone that is determined at a point in time based on perception data perceiving a driving environment surrounding the ADV, and
applying the control command to the ADV in response to determining that the range of confidence positions is within the safety zone.

18. The system of claim 17, wherein the operations further comprise:
adjusting the estimated control command, in response to determining that the range of confidence positions is outside of the safety zone; and
iteratively performing operations of determining a range of confidence positions and determining whether the range of confidence positions is within a safety zone.

19. The system of claim 18, wherein the iteratively performed operations are performed until the range of confidence positions is within the safety zone or a number of iterative performed operations reaches a predetermined threshold.

20. The system of claim 18, wherein estimating a control command based on the target position comprises:
calculating an acceleration required to reach the target position based on a current position and the current speed of the ADV; and
performing a lookup operation in a command estimation table based on the current speed and the acceleration to obtain a speed control command as the estimated control command.

21. The system of claim 20, wherein the command estimation table includes a plurality of mapping entries, each mapping entry mapping an acceleration to an estimated control command.

22. The system of claim 21, wherein each mapping entry further maps a corresponding command to a particular range of confidence positions associated with the corresponding command.

23. The system of claim 17, wherein estimating a control command based on the target position comprises:
calculating a change of steering angles required to reach the target position based on a current position and the current speed of the ADV;
performing a lookup operation in a command estimation table based on the current speed and the required change of steering angles to locate a matching entry; and
obtaining a steering control command as the estimated control command from the matching entry.

24. The system of claim 23, wherein the command estimation table includes a plurality of mapping entries, each mapping entry mapping a change of steering angle to an estimated control command and a particular range of confidence positions, and wherein the particular range of confidence positions is obtained from the matching entry.

* * * * *